Oct. 30, 1951 S. B. WICZER 2,572,899
VALVE
Filed Feb. 23, 1945 3 Sheets-Sheet 1

INVENTOR.
Sal B Wiczer
BY

Oct. 30, 1951     S. B. WICZER     2,572,899
VALVE

Filed Feb. 23, 1945     3 Sheets-Sheet 2

INVENTOR.
Sal B Wiczer
BY

Oct. 30, 1951 S. B. WICZER 2,572,899
VALVE
Filed Feb. 23, 1945 3 Sheets-Sheet 3
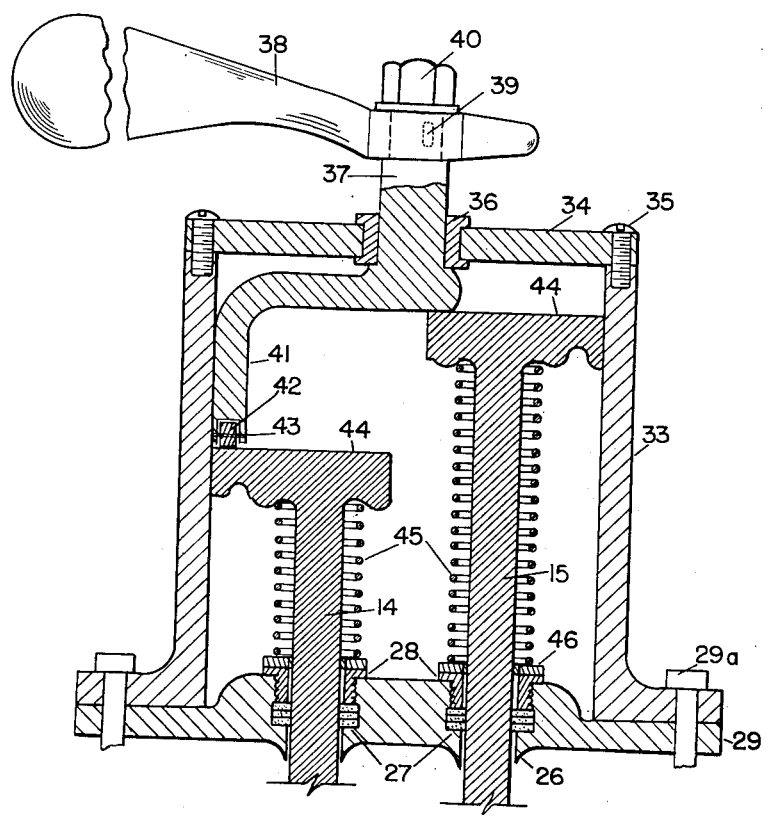
Fig. 5
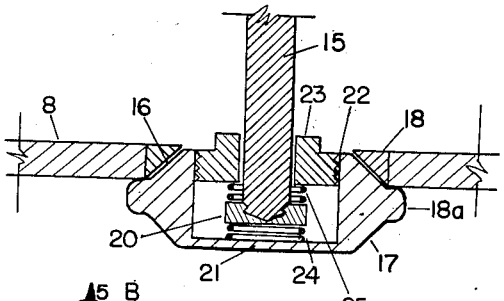
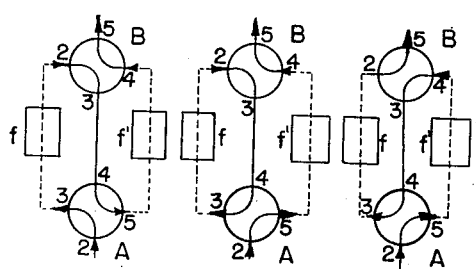
Fig. 7a  Fig. 7b  Fig. 7c
Inventor
Sol B Wiczer
By
Attorney Patented Oct. 30, 1951

2,572,899

UNITED STATES PATENT OFFICE 2,572,899

VALVE

Sol B. Wiczer, Washington, D. C.

Application February 23, 1945, Serial No. 579,378

1 Claim. (Cl. 277—13)

The present invention relates to multiway valves for unitary control of fluid flow from a plurality of sources and outlets.

Heretofore it has been the practice in the art to obtain unitary multiway control generally thru the use of plug and disc type valves. These valves notoriously have the disadvantage that the dirt or grit may collect in the plug or disc ways resulting in sticking, scoring of the surfaces and/or excessive wear. Moreover these valves have required lubrication and a high degree of fine adjustment resulting in the necessity of constant care to prevent leaking or binding.

It is therefore a primary object of the present invention to provide a valve suitable for multiway use with unitary control having the valve ports closed by contact over a small area by a reciprocating valve of the poppet or gate type so that present multiway valve may be broadly described as being of the globe or gate type.

It is a further object to provide a valve having a plurality of reciprocating stems operable with a unitary control.

It is a further object to provide a unitary control whereby a plurality of valve stems are simultaneously operated to open or close a plurality of valve ports from a single valve control mechanism. Other objects will be inherent and apparent to those skilled in the art.

The drawings presented herewith are only exemplary of the invention and show a four way valve together with certain modifications of both the valve and control mechanism therefor.

Fig. 5 is an enlarged elevation in section of a modified valve operating mechanism including an enlarged section of a valve closure showing the seat and valve in detail.

Figs. 7a, 7b and 7c are diagrammatic illustrations of a practical system in which the valve may be used.

Figure 1A:
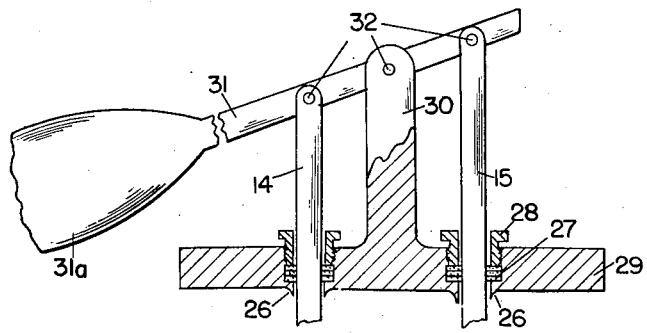
Fig. 1a is an elevation of a control mechanism partly in section to be attached to the valve.
Figure 1:
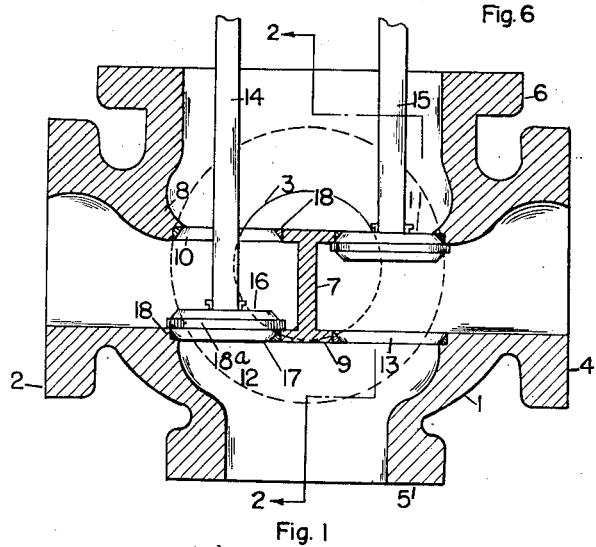
Fig. 1 is a sectional elevation thru a form of the valve having inlet and outlet connections in four directions.
Figure 2:
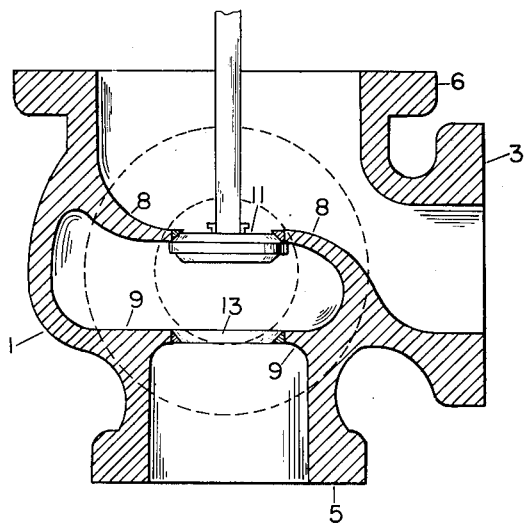
Fig. 2 is a side sectional elevation of the valve taken on the line 2—2 of Fig. 1.

Referring to Figs. 1, 1a and 2, 1 indicates generally a valve body having inlet and outlet flanges 2, 3, 4 and 5. It will be understood that the flanges are shown merely for convenience of illustration that they may be replaced with welded or threaded pipe connections. Another flange 6 is shown to which may be fitted any of the valve operating mechanisms hereinafter described. Internally the valve is divided by a vertical partition 7, joining with upper and lower horizontal partitions 8 and 9 respectively. The upper partition 8 has two valve ports 10 and 11 on each side of the partition 7. The lower partition 9 similarly has valve ports 12 and 13 cut therein so that valve port 10 is vertically aligned with valve port 12 and valve port 11 is vertically aligned with valve port 13, each vertical pair being separated by partition 7. As shown, both upper ports 10 and 11 through the horizontal partition 8 communicate laterally with inlet or outlet flanges 2 and 4 with the single inlet or outlet flange 3. Similarly as shown, both lower ports 12 and 13 through the horizontal partition 9 communicates laterally with inlet or outlet flanges 2 and 4 and with the single inlet or outlet flange 5.

Mounted for vertical reciprocation between each set of vertically aligned valve ports are poppet valves 14, arranged to reciprocate between valve ports 10 and 12, and 15 arranged to reciprocate between valve ports 11 and 13. These valves are shown as having any conventional seats 16 on the upper side of the valve head and 17 on the lower side of the valve head conventionally fitted or ground to a fluid tight seat against a valve seat insert 18. The upper and lower seat positions of the valve head 16 and 17 may be separated by a projecting boss 18a. Thus it will be seen with this construction the valve head has two seats 16 and 17 ground to fit either the upper port or lower port and by reciprocation by the valve operating mechanism, will be seated in either the upper or lower port, or according to some modified valve operating mechanisms such as described hereinafter, may be situated at some intermediate point between the upper and lower port.

Figure 6:
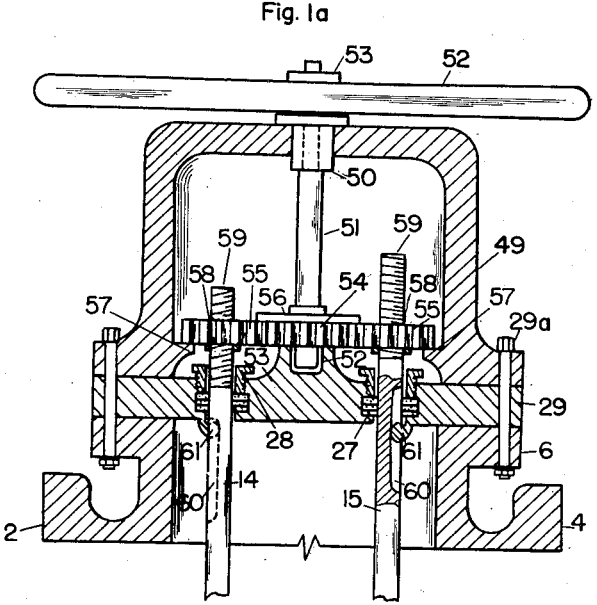
Fig. 6 is an elevation partly in section of a further modification of a valve operating mechanism.

The valve stem 15 as shown in greater detail in the lower portion of Fig. 5, is resiliently fitted to the valve head. To this end the valve stem has a large boss or collar 20 at the head extremity. The valve head is centrally cut out with a cylindrical bore having a lower partition portion 21, the inner walls of the head being threaded at 22 to receive a closing plug 23 which is loosely bored to receive the valve stem. Mounted between the boss 20 and the lower partition 21 is a spring 24. On the upper side of the boss 20 and beneath the plug 23 is a similar spring 25. It will thus be seen that the two springs are mounted to oppose each other above and beneath the boss 20 thus resiliently fixing the valve head between the plug 23 and the lower partition 21 to the boss 20 through the opposed springs 24 and 25. It will be apparent that the valve stems will impart resilient force to the valve heads to seat them in either an upper or lower valve port with a firm but resilient pressure substantially independent of fine adjustment of the valve stem operating mechanism. The valve stem may be supported through any conventional guides 26 in the valve operating mechanism conventionally packed to prevent leakage with packing 27 firmly held by packing adjusting bushings 28 threaded to the lower wall 29 of the valve operating mechanism which is fastened by suitable bolts 29a such as shown in Figs. 5 and 6 to the flange 6 in a fluid type joint.

Several types of valve operating mechanisms may be used. As shown in Fig. 1a, the valve operating mechanism may consist of a pedestal 30 fixed centrally to a base 29 between the projecting valve stems 14 and 15 in a common plane therewith. A lever 31 of any suitable length is pivoted to the end of the pedestal 30 and to the ends of each valve stem 14 and 15 through pins 32 for reciprocating motion of each valve stem through movement of the handle 31a attached to the lever 31 about the fulcrum in the end of the pedestal 30. The stems 14 and 15 are disposed a sufficient distance on either side of the pedestal 30 so that by movement of the lever the valve stems will both be simultaneously reciprocated a sufficient distance to move the valve heads each in opposite directions one from the lower port to the upper and the other from the upper to the lower aligned port. It will also be appreciated that the drawing is partially diagrammatic and the lever may be jointed at the upper end or the pins 32 may be fixed loosely to prevent binding at the joints.

In operation, still referring to Figs. 1 and 2 in the position of the valve as shown, fluid of one system entering at inlet 2 will pass thru open valve port 10 and thru outlet 3. Simultaneously fluid entering thru inlet 4 will pass thru open valve port 13 and out thru outlet 5. Operation of the lever will simultaneously reciprocate both valve stems closing valve ports 10 and 13 and opening valve ports 11 and 12 and the flow thru inlet 2 will be diverted to outlet 5 and the flow of fluid thru inlet 4 would be diverted to outlet 3. Depending on the particular fluid system any of the ports may be inlet and any outlet. Moreover the inlet ports may be any combination of two.

The practical applications of such valve are numerous and generally well known as in the application of plug and disc valves. For example referring to diagram 7a, if a fluid to be filtered or chemically treated were passed thru inlet 2 and outlet 3 to the filter or chemical contact tower f it could be returned first thru a second similar "B" valve inlet 2 and outlet 3 to the "A" valve passing thru inlet 4 and outlet 5 and thence to a second filter f' or chemical tower for a series or second filtration or treatment passing out of the second stage treatment thru the "B" valve inlet 4 and outlet 5 as pure or treated fluid. When the first filter or chemical tower is contaminated or exhausted the whole flow could be switched to the second stage by merely reversing the "A" valve to close ports 10 and 13 and open ports 11 and 12. Thus as shown in diagram 7b the inlet fluid at 2 would be diverted to outlet 5 which connects with the former second stage treatment f' and which would now operate as a single stage while the first stage was being cleaned. With the closing of port 13 of the "A" valve formerly receiving return first stage fluid and opening of port 11 connecting with outlet 3, the first stage inlet now forms a closed cycle of the first stage taking it out of the circuit, thus operating the whole system with the single valve operation. When the first stage has been cleaned or reconditioned, a single movement now of the "B" valve will reverse it as shown in diagram 7c causing the outlet fluid from the second stage f' entering at 4 and leaving at 3, to return to the "A" valve entering 4 and leaving at 3 to enter the cleaned former first stage f. Simultaneously this reversal of the "B" valve also opens original first stage outlet entering "B" valve at 2 and leaving the system to pure fluid storage from 5. Thus it will be seen that by hooking up two of the valves of the present invention a series treatment of fluid is possible allowing one stage to be cleaned by merely reversing one valve and then making the cleaned unit the second stage of treatment by reversing the second valve.

As a second practical example of the use of this valve assume the valve to be in the position as shown in Fig. 1 with inlet 2 open to the sea on a sea-going vessel and a ballast pump taking suction from outlet 3 pumping the water back thru the valve thru inlet 5 and the outlet 4 leading to ballast tanks to fill the same. It frequently involves a second pump or much piping or valving to empty the ballast tank since plug valves corrode, leak or stick, but by merely reversing this valve the pump still taking suction from outlet 3 takes water now from inlet 4 connected to the ballast tank and still discharges it to valve inlet 5 but thence back to the sea thru outlet 2. This valve in the same hookup would equally suffice for taking fluid from one tank and discharging it to another and return it to the first tank when the valve is reversed.

If both inlets to the valve are piped to adjacent ports, for example to both inlets 2 and 5 to make both 3 and 4 outlets, then the flows, which may be the same liquid are divided between these outlets. But it will be obvious that with such hookup if the valve is reversed then there would be no outlet flow at all since both ports 10 and 13 would be closed by the valve reversed, resulting in shutting off all flow through the valve. The valve will also be noted to have utility in various other fields. For further example it would be possible therewith to alternate fluids in the same main feeding thereto first one fluid, then another—either gaseous, vaporous, or liquid, or any combination thereof.

Figure 3:
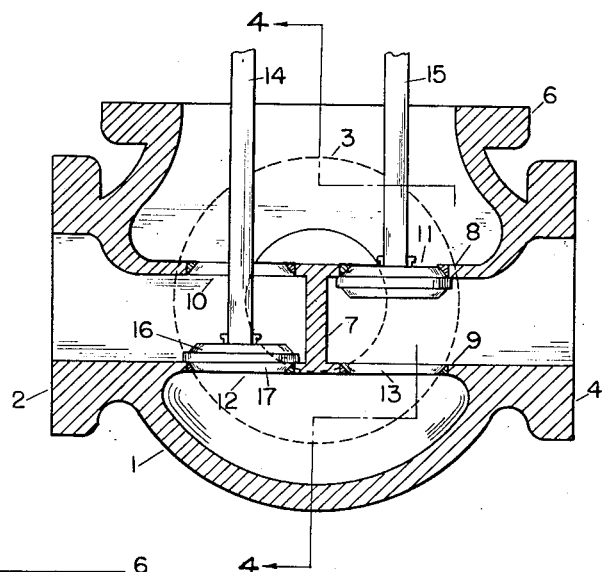
Fig. 3 is a form of the valve shown in Fig. 1 with the modification that inlet and outlet connections are located in the same plane.
Figure 4:
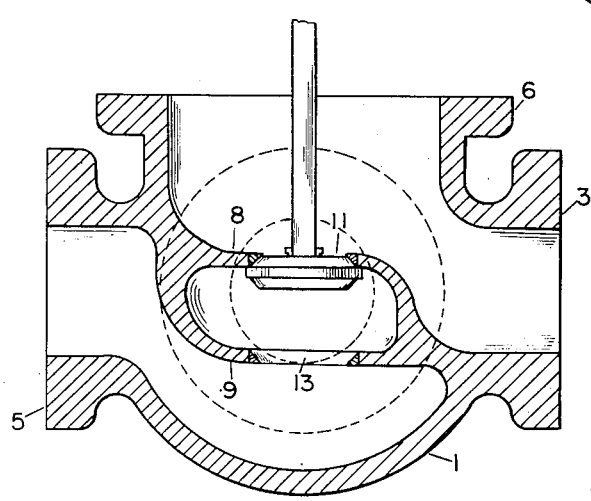
Fig. 4 is a side sectional elevation of the valve shown in Fig. 3 taken on the line 4—4 of Fig. 3.

For many purposes, it is desirable to have all inlet and outlet connections lying in the same plane. For this purpose a modified valve is shown in Figs. 3 and 4. These figures are substantially the same as Figs. 1 and 2, the same reference characters being used as in Figs. 1 and 2 but it will be noted that flange 5 instead of being vertically opposite to the valve operating mechanism is now in the same horizontal plane with flanges 2, 3, and 4, this being accomplished by a minor change in the shape of the internal partitioning.

Other modified valve operating devices may be used. As shown in Fig. 5 a modified valve operating mechanism having a cylindrical shell 33 is adapted to be fastened over a closure plate 29 to flange 6 of the valve through bolts 29a. This control mechanism has a cover plate 34 fastened to the end of the cylinder 33 through screws 35. The cover plate 34 has centrally fitted a bushing 36 and a shaft 37 fitted for rotation therein. The outer end of the shaft 37 has a handle 38 keyed at 39 to the shaft for manual rotation thereof and fixed by a nut 40 threaded to the end of the shaft. The inner end of the shaft 37 terminates in a camlike projection 41 having a roller 42 mounted for rotation on a pin 43 extending therethrough and through the cone portion 41 of the shaft.

The valve stems 14 and 15 project through the closure plate 29 which is suitably packed with packing 27 and retaining bushings 28 threaded into the closure plate 29. The lower portion of the cover plate 29 surrounding the valve stems 14 and 15 at 26 acts as a guide for the valve stems. The upper end of the valve stems are semi-circular conforming to the shape of the cylindrical shell 33 and form a shelf or platform 44 on which the cam 41 and roller 42 rides. Helical springs 45 surround the valve stems and are retained between the under portion of the platform 44 and the cover-plate 29 or the packing bushings and washers 46 attached hereto. According to this construction both springs 45 will continuously urge the valves to close the upper ports 12 and 13. The cam 41 riding on the platforms 44 will alternately depress one valve stem or the other depending on the portion of the handle 38 against the pressure of the spring 45 forcing the valve stem and valve head down to close the lower valve port. Thus by rotating the handle either valve will be alternately closed at the lower port and the platform 44 on which the cam is not pressing will be released to close the upper port under the urging of spring 45 as shown in Fig. 5.

Another modification of a valve operating mechanism is shown in Fig. 6. A shell 49, which may be merely a yoke if desired, is mounted on a cover plate 29, in turn fitted to flange 6 of the valve and suitably fastened thereto as with bolts 29a. The upper part of the body 49 is centrally fitted with a bushing 50 in which a shaft 51 is mounted for rotation on the outer end of which a wheel 52 fixed by nut 53 threaded to the end of the shaft 51 is fixed for manual rotation thereof. The lower end of the shaft 51 is fitted into a socket 52 formed by a boss 53 built up on the plate 29. The socket 52 merely holds the shaft 51 for free rotation thereof and on the boss 53 a shoulder is formed for retaining a pinion gear 54 keyed to shaft 51 for rotation therewith. The pinion gear 54 meshes with twin cooperating pinion gears 55 mounted and centrally bored and threaded at 58 for rotation with cooperating threads 59 upon each of the valve stems 14 and 15 for vertical movement respectively of said valve stems. A shoulder 56 mounted above pinion gears 55 projects over each of said pinion gears 55 preventing vertical movement. A lower shoulder 57 is situated beneath pinion gears 55 and prevents axial movement thereof. A keyway or slot 60 is axially cut intermediate the ends of the valve stems to slidably engage a lip 61 depending from the plate 29 to prevent rotation of the valve stems. The pinion gear 54 by rotation of the valve wheel 52 will rotate therewith. Hence by rotation of the wheel 52 will turn pinion gear 54 and pinion gears 55 meshed therewith in opposite directions and since each are threaded to the ends of the valve stems 14 and 15 will, by rotation of wheel 52 in one direction, simultaneously raise one valve stem and lower the other through the threaded ends 59 and rotation of the gears 55 axially fixed thereon between shoulders 56 and 57.

Other variations and modifications of the valve and operating mechanism therefor, will be apparent to one skilled in the art and it is intended that the present disclosure be unlimited except as provided by the claim hereinafter appended.

A four way valve having two inlets and two outlets symmetrically disposed about a valve body to have the centers thereof lying in a single plane, said inlets and outlets being integrally interconnected by rounded outwardly bulging valve body walls adapted to minimize fluid turbulence by passage of fluid therethrough, a pair of partitioning walls separated from each other a sufficient distance to define therebetween valve chambers, said partitioning elements being parallel to and symmetrically disposed both above and below said plane of inlets and outlets in the central area of the valve body, said centrally parallel partitioning elements terminating at one side in a wall joining both partitioning elements and curved from the lower partition upwardly to integrally join the outer wall of said valve body above one of said inlets or outlets, whereby said inlet or outlet communicates directly with a rounded lower chamber beneath said valve chambers in fluid turbulence reducing manner, said parallel partitioning elements terminating at the opposite side in a wall joining both partitioning elements and curved from the upper partition downwardly to join the outer wall of said valve body below the inlet or outlet which is diametrically opposite to said first mentioned inlet or outlet, whereby said oppositely disposed inlet or outlet communicates directly with an upper chamber above said valve chambers, both ends of said partitioning elements being open and passing directly to and integrally joined to the outer walls of said valve body both above and below the two remaining inlets or outlets whereby each of said remaining inlets or outlets communicate directly with the valve chambers formed between said partitioning elements, a third partitioning element centrally and vertically mounted in said valve chamber integrally joined to the parallel partitioning elements and curved sidewalls to separate the same into two co-planar and contiguous valve chambers centrally disposed of said valve body and communicating directly each with a valve inlet or outlet, two pairs of vertically aligned valve ports in said parallel partitioning elements each pair being disposed in vertical alignment on opposite sides of said vertical partitioning element, two poppet valves each mounted separately to reciprocate vertically, the inner end of each stem extending through an upper valve port for reciprocation between aligned valve ports, the outer ends of said stems extending through the upper chamber of said valve body, a pair of circular valve closure discs each mounted on the inner end of a valve stem, both sides of each of said discs being shaped to seat alternatively on the upper and lower valve ports within the said valve chambers, each to close one port while opening the other, whereby fluid flow through each of the valve chambers tends to press the valve closure into secure valve closing position, and means for simultaneously reciprocating both valve stems, each in an opposite direction to the other.

SOL B. WICZER.

REFERENCES CITED

The following references are of record in the file of this patent:

UNITED STATES PATENTS

| Number | Name | Date |
|---|---|---|
| 588,458 | Matton | Aug. 17, 1897 |
| 684,102 | Riddell | Oct. 8, 1901 |
| 1,155,594 | Mariotti | Oct. 5, 1915 |
| 1,544,916 | Ludeman | July 7, 1925 |
| 2,043,668 | Kohler | June 9, 1936 |
| 2,240,163 | Pick | Apr. 29, 1941 |
| 2,354,960 | Morehouse | Aug. 1, 1944 |

FOREIGN PATENTS

| Number | Country | Date |
|---|---|---|
| 765,185 | France | Mar. 19, 1934 |